US012705291B1

(12) United States Patent
Masurek et al.

(10) Patent No.: US 12,705,291 B1
(45) Date of Patent: Aug. 11, 2026

(54) GENERATING AND MANAGING A KNOWLEDGE DATABASE

(71) Applicant: Schlumberger Technology Corporation, Sugar Land, TX (US)

(72) Inventors: Nicole Masurek, Aachen (DE); Bernadette Lipinski, Aachen (DE); Charlotte Elizabeth Kristen Wray, Aachen (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/094,077

(22) Filed: Mar. 28, 2025

(51) Int. Cl.
*G06F 16/93* (2019.01)

(52) U.S. Cl.
CPC .................................... *G06F 16/94* (2019.01)

(58) Field of Classification Search
CPC ........................................................ G06F 16/94
See application file for complete search history.

(56) References Cited

U.S. PATENT DOCUMENTS

| | | | | |
|---|---|---|---|---|
| 7,503,032 | B2 * | 3/2009 | Bhaskaran | G06Q 10/06<br>705/348 |
| 7,590,640 | B2 * | 9/2009 | Wolber | G06Q 10/10 |
| 8,176,004 | B2 * | 5/2012 | Malaney | G06Q 10/00<br>709/219 |
| 8,924,269 | B1 * | 12/2014 | Seubert | G06Q 40/00<br>705/35 |
| 9,436,349 | B2 * | 9/2016 | Ranz | G06F 3/0482 |
| 10,430,504 | B1 * | 10/2019 | Narayanamurthi | G06F 40/166 |
| 11,580,173 | B2 * | 2/2023 | Skiff | H04L 67/01 |
| 2007/0136342 | A1 * | 6/2007 | Singhai | G06F 9/453 |
| 2010/0070930 | A1 * | 3/2010 | Thibault | G06F 16/322<br>715/854 |
| 2013/0078963 | A1 * | 3/2013 | Prasad | H04M 1/6091<br>455/414.1 |
| 2013/0132297 | A1 * | 5/2013 | Peter | G06Q 10/067<br>705/342 |
| 2015/0269586 | A1 * | 9/2015 | Garia | G06Q 30/016<br>705/304 |
| 2021/0065573 | A1 * | 3/2021 | Rakshit | G06N 5/022 |

* cited by examiner

*Primary Examiner* — Debbie M Le
(74) *Attorney, Agent, or Firm* — Kyle R. Miiller

(57) ABSTRACT

A decision management system may store a first version of a document in a knowledge database. A decision management system may receive an updated version of the document. A decision management system may store the updated version of the document in the knowledge database. A decision management system may receive a business decision associated with one of the first version or the updated version. A decision management system may link the one of the first version or the updated version to the business decision.

15 Claims, 6 Drawing Sheets

GENERATING AND MANAGING A KNOWLEDGE DATABASE

BACKGROUND OF THE DISCLOSURE

With the proliferation of digital communication and remote storage, users create, receive, and modify numerous documents. Over time, many versions of a single document may have been produced, saved, and stored in disparate locations. Additionally, document naming and version numbering may be inconsistent. As a result, it may be difficult and time-consuming for an operator to find a specific version of a document (i.e., the latest version).

Organizations, including businesses, teams, groups, classes, laboratories, and so forth, generate documents, which may include significant volumes of documents. These documents are often used to make decisions, such as decisions to implement a plan, purchase equipment, or other business decisions. But, over time, the record of the underlying information used to make the decision may be lost and/or be inaccessible due to changes in personnel, saving of local copies, or other discontinuities in the versioning of the document. This may result in the wrong version of a document being updated and/or a decision made using the wrong version. Due to the obstacles currently in the field, a solution to document versioning and retention is needed.

SUMMARY

In some aspects, the techniques described herein relate to a method for maintaining document continuity. A decision management system receives a request associated with a business decision and a document in a knowledge database. The decision management system identifies a version of the document based on the business decision. The decision management system provides the version of the document to a user.

A decision management system stores a first version of a document in a knowledge database. The decision management system receives an updated version of the document. The decision management system stores the updated version of the document in the knowledge database. The decision management system receives a business decision associated with one of the first version or the updated version. The decision management system links the one of the first version or the updated version to the business decision.

A decision management system presents, on a GUI of a computing device, a first selectable icon of a first version of a document in a knowledge database, a second selectable icon of an updated version of the document in the knowledge database, and a third selectable icon of a business decision associated with one of the first version or the updated version. The decision management system receives a first selection of the first selectable icon or the second selectable icon. The decision management system presents, on the GUI and based on the first selection, the first version of the document or the updated version of the document. The decision management system receives a second selection of the third selectable icon. The decision management system presents, on the GUI and based on the second selection, supporting documentation associated with the business decision.

This summary is provided to introduce a selection of concepts that are further described in the detailed description. This summary is not intended to identify key or essential features of the claimed subject matter, nor is it intended to be used as an aid in limiting the scope of the claimed subject matter. Additional features and aspects of embodiments of the disclosure will be set forth herein, and in part will be obvious from the description, or may be learned by the practice of such embodiments.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
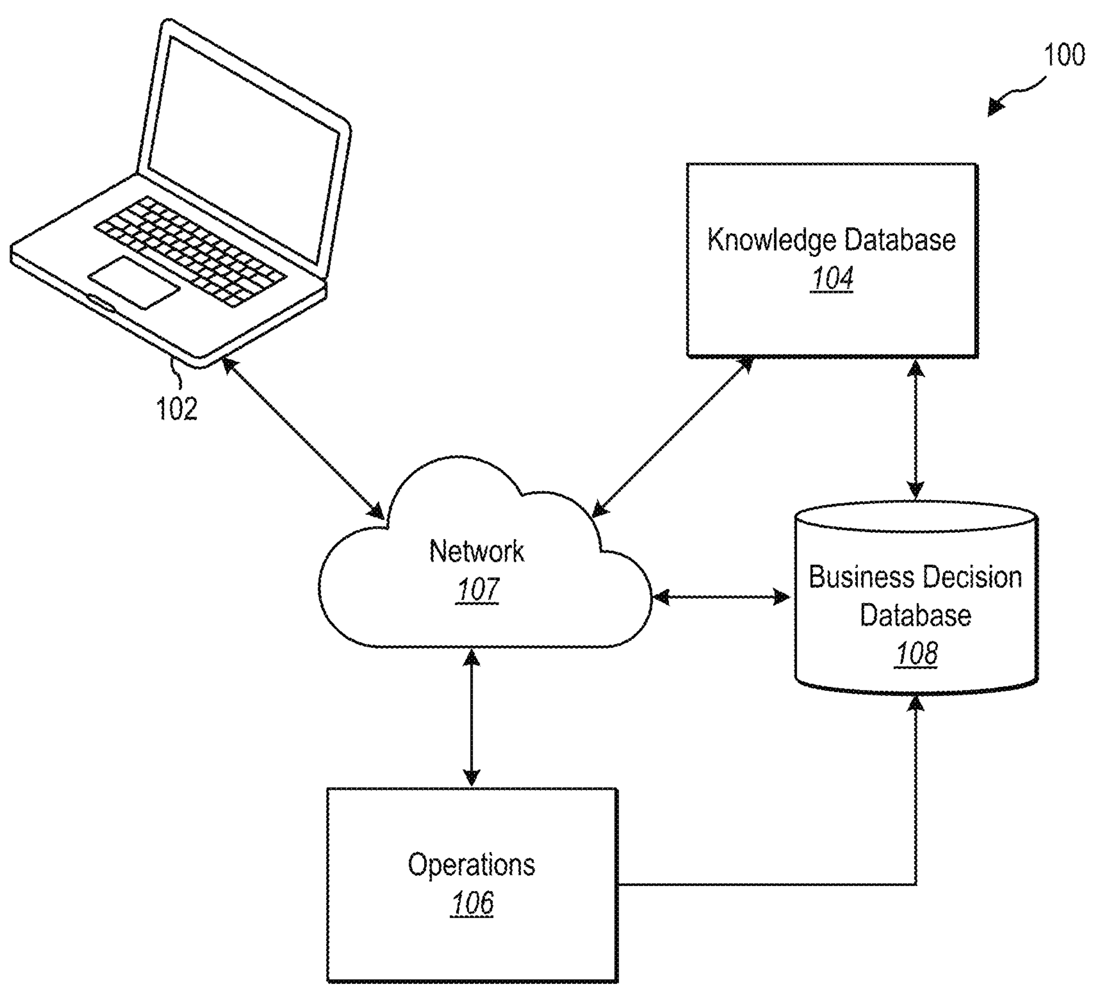
FIG. 1 is a representation of a decision management system, in accordance with at least one embodiment of the present disclosure.

This disclosure generally relates to devices, systems, and methods for identifying and maintaining the current version of a document and identifying business decisions associated with a particular version of the document. Oil and gas exploration, planning, operations, production, processing, and so forth (collectively referred to herein as "operations") may involve multiple individuals, teams, departments, contractors, and others. Oil and gas operations may generate multiple documents. The documents contain data that is used to make business decisions. However, in some situations, a decision maker may make a decision using an out-of-date document. In this situation, the business decision may result in increased costs, increased project duration, or may cause a project to fail altogether.

As a specific, non-limiting example, a document (or other content type) may include geological data regarding the formation type, depth, and thickness of one or more strata of the formation. The document may have a first version, which may be a preliminary report based on a first set of sensor data. An updated version of the document may be an updated report based on a second set of sensor data and/or additional or different analysis of the sensor data. The updated version may include changes to the data, such as changes to the formation type, the formation depth, the formation thickness, any other data, and combinations thereof including inclusions or exclusions of one or more of the foregoing. A business decision may include the design and approval of a wellbore trajectory design. When an operator designs the wellbore trajectory using the first version, the wellbore trajectory may intersect a target formation at the wrong location and/or be an improper depth. In this manner, making a business decision based on the first version, compared to the second version, may result in an undesirable trajectory.

While embodiments of the present disclosure discuss documents, it should be understood that the techniques of the present disclosure may be applied to any collection of data, including documents, data files, programming code, sensor data, images, simulations, models, lab reports, financial reports, operation reports, any other collection or analysis of data, and combinations thereof, including inclusions or exclusions of any of the foregoing.

While the above example is described as involving a business decision to generate a wellbore trajectory, it should be understood that a business decision may include any type of decision. For example, the business decision may include one or more of a simulation, a model, a purchase of capital equipment, a hiring decision, a contractual relationship, a partnership, an opportunity, an investment, a joint venture, an acquisition, any other business decision, and combinations thereof, including inclusions or exclusions of one or more of the foregoing.

In accordance with at least one embodiment of the present disclosure, a decision management system may link business decisions to particular versions of documents. The decision management system may maintain a knowledge database. The knowledge database may maintain versions of a particular document. The versions of the document may include time stamps, author (including the original author and version or revision author), content summary, any other document information, and combinations thereof, including inclusions and exclusions of any of the foregoing. Linking the business decision to the version of the document may facilitate identification of the information used to make the decision.

Linking the business decision to a version of the document may include any type of link. For example, linking the business decision may include the identification of supporting documentation related to the business decision. In some examples, linking the business decision may include the identification of a decision maker, or the person who made the decision. In some examples, linking the business decision may include a link to the output or result of the business decision.

In accordance with at least one embodiment of the present disclosure, a user may have a business decision to make. The business decision may be associated with a document. When the user consults the document, the user may retrieve the latest version of the document from a knowledge database. In some embodiments, the user may consult the knowledge database and previous versions of the document, including previously linked business decisions, to make the business decision. In this manner, the user may facilitate an informed decision using the most up-to-date information from the knowledge database.

In accordance with at least one embodiment of the present disclosure, the user may desire to access quality assured documents. For example, a document in the knowledge database may be quality assured, meaning that the document has been reviewed or otherwise processed according to one or more standards. A new document may be saved to the knowledge database when the document has been quality assured. This may facilitate additional updates to the document and/or other use of the document based on the quality assurance.

FIG. 1 is a representation of a decision management system 100, in accordance with at least one embodiment of the present disclosure. The decision management system 100 may include a computing device 102. A user may access and update a knowledge database 104 from the computing device 102. For example, the user may access a document from the knowledge database 104 associated with operations 106. The document may include data related to the operations 106. For example, the document data may include operational data, survey data, economic data, resource data, personnel data, geographic data, geologic data, survey data, operational goals, operational constraints, any other document data, and combinations thereof, including inclusions and exclusions of any of the foregoing.

The computing device 102 may be in communication with the knowledge database 104 and/or the operations 106 over a network 107. The network 107 may include any type of network, such as the Internet, an intranet, a local area network (LAN), a wide area network (WAN), a wireless network, a wired network, any other network, and combinations thereof, including inclusions and exclusions of any of the foregoing.

In some embodiments, the user and the computing device 102 may be located at a field location of the operations 106. For example, the computing device 102 may include a mobile computing device, such as a laptop computer, a tablet, a smartphone, any other mobile computing device, and combinations thereof, including inclusions and exclusions of any of the foregoing. In some examples, the computing device 102 may include a desktop computing device, such as a tower computer or other desktop computing device. In some embodiments, the document may be based on or include information or data from a feature of the operations 106. For example, the document may include survey data from sensors at the operations 106. In some examples, the document may include an analysis of information collected at the operations 106. In some embodiments, the document may include data collected at a remote location from the operations 106. In some embodiments, the user may access the document from a location remote from the operations 106.

In accordance with at least one embodiment of the present disclosure, the user may access the knowledge database 104 from the computing device 102 over the network 107. In some embodiments, the only copy of the document available to the user may be on the knowledge database 104.

In some embodiments, the user may update the information in the document and save the document as a new version in the knowledge database 104. For example, any time the user (or any user) provides an update to the document, the document may be saved as a new version in the knowledge database 104. In some embodiments, the document may be saved as a new version automatically. For example, every time the user updates an aspect of the document, the decision management system 100 may automatically save a new version of the document in the knowledge database 104. In some examples, the decision management system 100 may periodically or episodically save a new version of the document. For example, the decision management system 100 may save a new version of the document hourly, twice daily, daily, weekly, or over any other period. In some examples, the decision management system 100 may save a new version of the document when the decision management system 100 detects a threshold change in the content of the document, such as a change in the size of the document or a change in a threshold number of characters (e.g., numbers and letters) or a change in the images of the document. When the decision management system 100 detects the change in the content of the document, the decision management system 100 may automatically save the new version in the knowledge database 104.

The knowledge database 104 may save the updated document as a new version of the knowledge database 104. For example, the new version of the document may include a separate document. In some examples, the new version of the document in the knowledge database 104 may include a changelog of the changes to the document.

The user may access a particular version of the document from the knowledge database 104. For example, the user may access the most up-to-date version of the document from the knowledge database 104. In some examples, the user may desire to see how the document has changed over time, or may desire to see the content of the document at a previous point in time.

In accordance with at least one embodiment of the present disclosure, the document may be linked to a business decision that the document influenced. For example, the decision management system 100 may include a business decision database 108. The business decision database 108 may include information associated with the business decision. For example, information associated with the business decision may include documentation supporting the business decision. Documentation supporting the business decision may include cost or purchase documentation (e.g., receipts, invoices associated with the purchase), sale information (e.g., receipts, invoices associated with the sale), reports (e.g., reports associated with the business decision), graphs, charts, and so forth. In some examples, information associated with the business decision may include contact information for a decision-maker and/or a person responsible for at least a portion of the business decision. In some embodiments, the document may support a portion of the business decision. For example, the document may support an aspect of the business decision specific to the content of the document. The document may be linked to this portion of the business decision. Linking the document to the business decision may facilitate an understanding of the information that lead to the business decision.

In accordance with at least one embodiment of the present disclosure, a specific version of the document may be linked to the business decision. For example, a business decision may have been made in the past. When the past business decision was made, the user may have used the most up-to-date information available at that time to make the business decision. This most up-to-date information may be reflected in the most up-to-date version of the document at the time. The user may link the business decision to the specific version of the document.

In some embodiments, when the user prepares and the decision management system 100 stores an updated version of the document in the knowledge database 104, the user may make a new business decision (or an updated business decision) based on the updated version. The user may link the new business decision to the updated version of the document, thereby maintaining a record of the information that informed the decision.

In some embodiments, the user may desire to make a business decision. The user may submit a request to the knowledge database 104 for information associated with the business decision. For example, the user may send a request to the knowledge database 104 based on features associated with the business decision. The knowledge database 104 may provide a document from the knowledge database 104 associated with the business decision. In some embodiments, the knowledge database 104 may provide the most up-to-date version of the document. The user may review the most up-to-date version of the document and use the data contained therein to make the business decision.

When the user makes a business decision based on data or information contained in a particular version of the document, the user may link the business decision to the version of the document. In this manner, the record of the version of the document used to influence the business decision may be maintained.

Figure 2:
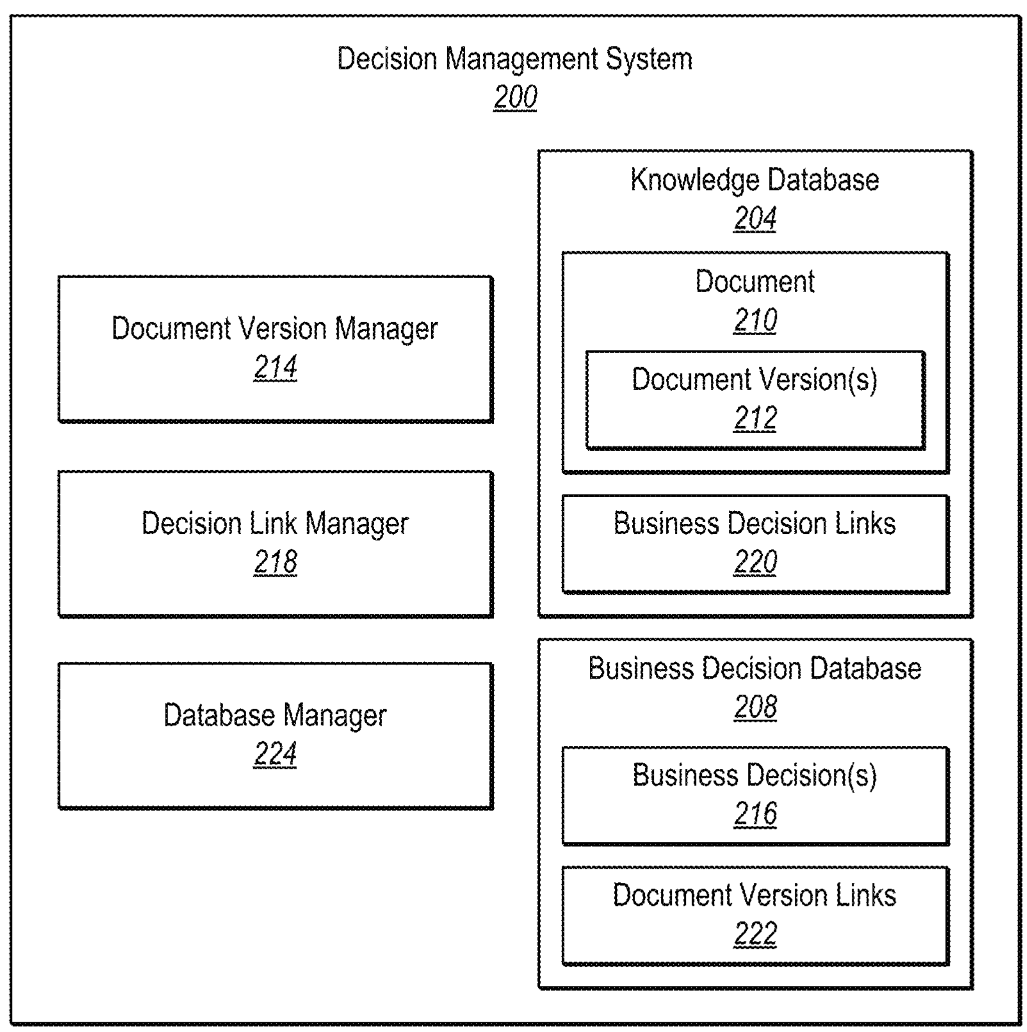
FIG. 2 is a representation of a decision management system, according to at least one embodiment of the present disclosure.

FIG. 2 is a representation of a decision management system 200, according to at least one embodiment of the present disclosure. Each of the components of the decision management system 200 can include software, hardware, or both. For example, the components can include one or more instructions stored on a computer-readable storage medium and executable by processors of one or more computing devices, such as a client device or server device. When executed by the one or more processors, the computer-executable instructions of the decision management system 200 can cause the computing device(s) to perform the methods described herein. Alternatively, the components can include hardware, such as a special-purpose processing device to perform a certain function or group of functions. Alternatively, the components of the decision management system 200 can include a combination of computer-executable instructions and hardware.

Furthermore, the components of the decision management system 200 may, for example, be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Furthermore, the components may be implemented as one or more web-based applications hosted on a remote server. The components may also be implemented in a suite of mobile device applications or "apps."

The decision management system 200 includes a knowledge database 204. The knowledge database 204 may include one or more documents 210. As discussed herein, the document 210 may include any type of document, including documents including operations information or information related to the business. The knowledge database 204 may maintain a record of one or more document versions 212 of the document 210. The document versions 212 may include historical representations of the document 210.

In some embodiments, the documents 210 stored in the knowledge database 204 may only be accessible through the knowledge database 204. For example, the documents 210 may include permissions or locks that prevent a user from opening and/or modifying the document 210 except through the knowledge database 204 (e.g., except through selecting a selectable icon of a GUI of the knowledge database 204). In some examples, the documents 210 may not be downloadable from the knowledge database 204. For example, when a user opens a document 210 or a document version 212 of the document 210, the user may not be able to save a local copy of the document 210. In this manner, only accessing a document 210 through the knowledge database

204 may reduce or prevent the generation of local copies or copies of the document 210 that are not saved or recorded in the knowledge database 204.

The document versions 212 may include information related to the version of the document, such as the timestamp of the version 212, a changelog of the version 212, an author of the document 210 and/or the author of the changes resulting in the updated version 212, and so forth. When the user prepares a revision or update to the document 210, a document version manager 214 may save the updated document versions 212 to the knowledge database 204.

The document version manager 214 may save updated document versions 212 in any manner. For example, as discussed herein, the document version manager 214 may identify when the content of the document 210 has changed and save the updated document version 212. In some examples, the document version manager 214 may save the updated document version 212 to the knowledge database 204 periodically to maintain a record of the changes as they are being made.

As discussed herein, the document 210 may include multiple different document versions 212. For example, a single document 210 may be updated several times over the lifetime of the document. The lifetime of the document may be the duration over which the document may be used to inform one or more business decisions. For example, the lifetime of the document may be measured in days, weeks, months, or years.

The decision management system 200 may further include a business decision database 208. The business decision database 208 may include a record of business decisions 216. As discussed herein, the business decisions 216 may be decisions that impact the business. The business decisions 216 may be stored in the business decision database 208 in any manner. For example, the business decisions 216 may be stored in the business decision database 208 as approval documentation (such as a corporate form that includes approval signatures or other elements that indicate approval of the decision), receipts, purchase orders, reports, publications, model/simulation outputs, field reports, production reports, survey information, any other documentation associated with the business decisions 216, and combinations thereof, including inclusions and exclusions of any of the foregoing.

As discussed herein, a document 210 from the knowledge database 204 and the business decisions 216 may be linked. For example, a decision link manager 218 may generate business decision links 220 for the documents 210. A particular business decision link 220 may associate a particular document version 212 with a particular business decision 216. The business decision links 220 may be any type of link. For example, the business decision links 220 may include a pathway from the knowledge database 204 to the business decisions 216 in the business decision database 208. In some embodiments, the business decision links 220 may include a copy of the supporting documentation for the associated business decision 216. In some embodiments, the business decision links 220 may include contact information for the decision maker(s), team, group, or department that made the business decision 216. In some embodiments, the contact information may be contact information for the person, people, or group that made the business decision 216 at the time it was made. In some embodiments, the contact information may be contact information for the person, people, or group that is currently responsible for the business decision 216.

The decision link manager 218 may generate the business decision links 220 in any manner. For example, the decision link manager 218 may receive an instruction from the user to link the document version 212 to the business decision 216. In some examples, the decision link manager 218 may utilize artificial intelligence or machine learning to identify business decisions 216 that are made using various document versions 212. In some examples, the decision link manager 218 may generate the business decision links 220 based on previous business decisions 216 associated with related subject matter.

In accordance with at least one embodiment of the present disclosure, the decision link manager 218 may generate the supporting documents for the business decisions 216. In some situations, the pre-existing supporting documentation for a business decision 216 may not be clear. For example, the pre-existing supporting documentation for the business decision 216 may be unclear, or may not clearly identify one or more aspects of the business decision.

In some embodiments, when a business decision 216 has been made, the decision link manager 218 may attempt to identify the supporting documentation for the business decision 216. When the decision link manager 218 does not identify sufficient supporting documentation, the decision link manager 218 may generate the supporting documentation, or the decision link manager 218 may generate a portion of the supporting documentation associated with the portion that is missing. For example, the decision link manager 218 may attempt to identify supporting documentation having various decision aspects. For example, the aspects of the supporting documentation may include one or more of responsible person or persons, business group, contact information, reports, publications, costs, revenue, invoices, receipts, any other aspects of the supporting documentation, and combinations thereof.

The decision link manager 218 may generate the supporting documentation in any way. For example, the knowledge database 204 may maintain a record of people that have accessed the document 210 and/or various document versions 212 of the document 210. The decision link manager 218 may generate the supporting documentation by identifying the users or operators that have accessed the document 210 and/or the document versions 212 of the document 210. In some examples, the decision link manager 218 may query the user for information for the supporting documentation. In some examples, the decision link manager 218 may identify business decisions 216 having similar details and generate the supporting documentation based on the similar business decisions 216. When the decision link manager 218 generates the supporting documentation, the decision link manager 218 may save the supporting documentation in the business decision database 208. In this manner, the decision link manager 218 may ensure that the business decision database 208 has sufficient supporting documentation for a user to identify what business decisions 216 are made using the document 210 and/or document versions 212 of the document 210.

The decision link manager 218 may further generate document version links 222 for the business decisions 216. The document version links 222 may reference the documents 210 and/or the document versions 212 of a particular document 210 that were used to make a particular business decision 216. For example, the supporting documentation for a business decision 216 may be linked to the document versions 212 used to make the business decision 216. In this manner, when a user reviews the business decisions 216, the user may identify the documents 210 and the document versions 212 that were used to make the business decision.

In some embodiments, a particular document 210 or document version 212 may be used to inform or make more than one business decision 216. For example, the document version 212 may include multiple business decision links 220 to multiple business decisions 216. This may reflect that a single document 210 may impact more than one business decision 216.

In some embodiments, a particular business decision 216 may be informed by multiple documents 210. For example, a business decision 216 may include document version links 222 to a particular document version 212 of multiple documents 210. This may reflect that a single business decision 216 may be based on multiple documents 210.

In some embodiments, a user may desire to access a particular document 210. The user may send a request or query to the decision management system 200. A database manager 224 may review the knowledge database 204 to identify the most up-to-date document version 212 of the document 210. The database manager 224 may retrieve the most up-to-date document version 212 of the document 210. In this manner, a user may access the current version of the document 210, thereby preventing the user accessing old, irrelevant, or out of date information contained in the document 210.

In some embodiments, the user may request old information from the document 210. For example, the user may desire to identify what information was available at a particular time. In some examples, the user may desire to review the document versions 212 to identify when certain information was recorded in the document 210. The database manager 224 may identify the time in the request, the content of the request, or other elements of the request to identify the relevant document version 212.

In some examples, the user may desire to review the information that influenced a particular business decision 216. For example, the user may submit a query associated with a particular business decision 216. The database manager 224 may identify one or more document version links 222 associated with the business decision 216. The database manager 224 may, based on the document version links 222, retrieve and provide the associated document versions 212 to the user. In this manner, the user may identify the information available and/or used at the time that the business decision was made.

Figure 3:
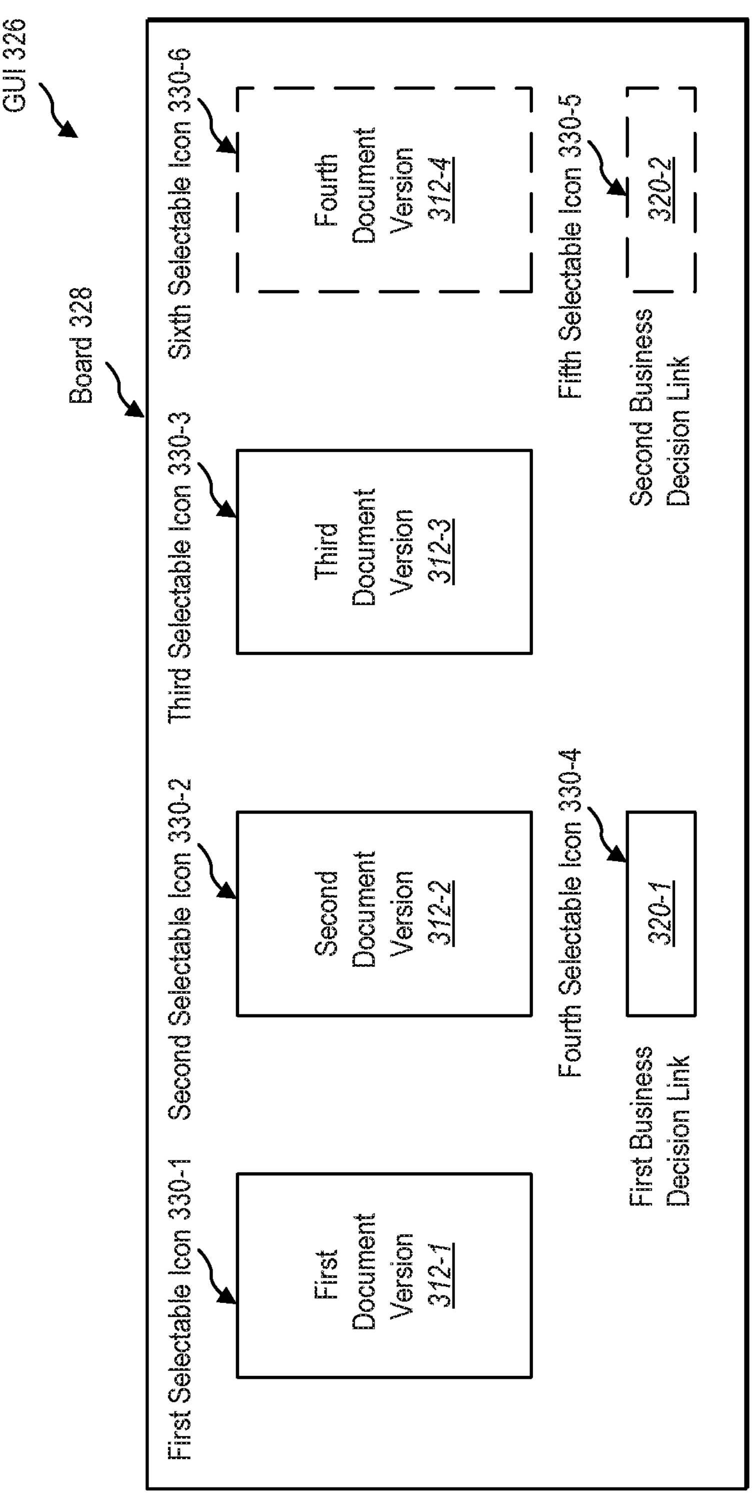
FIG. 3 is a schematic representation of a graphical user interface (GUI), according to at least one embodiment of the present disclosure.

FIG. 3 is a schematic representation of a graphical user interface (GUI) 326, according to at least one embodiment of the present disclosure. The GUI 326 may include a board 328. The board 328 may be a board that identifies the version history of a particular document. The board 328 includes multiple selectable icons (collectively 330). For example, the board 328 may include a first selectable icon 330-1, a second selectable icon 330-2, and a third selectable icon 330-3. The first selectable icon 330-1 may be illustrative of a first document version 312-1 of the document, the second selectable icon 330-2 may be illustrative of a second document version 312-2, and the third selectable icon 330-3 may be illustrative of a third document version 312-3.

The GUI 326 may be presented to the user on the display of a computing device. The selectable icons 330 may be selectable by the user to perform a particular action. For example, when the user selects the first selectable icon 330-1 (e.g., when the computing device receives a selection of the first selectable icon 330-1), the computing device may open the first document version 312-1 of the document. When the user selects the second selectable icon 330-2 (e.g., when the computing device receives a selection of the second selectable icon 330-2), the computing device may open the second document version 312-2 of the document. When the user selects the third selectable icon 330-3 (e.g., when the computing device receives a selection of the third selectable icon 330-3), the computing device may open the third document version 312-3 of the document.

The GUI 326 may further include a fourth selectable icon 330-4. The fourth selectable icon 330-4 may be illustrative of a first business decision link 320-1. When the user selects the fourth selectable icon 330-4 (e.g., when the computing device receives a selection of the fourth selectable icon 330-4), the computing device may open supporting documentation associated with the business decision. As discussed herein, the first business decision link 320-1 may facilitate the identification of a business decision that used or relied on the particular document version.

In some embodiments, the user may desire to modify the document. To modify the document, the user may select the third selectable icon 330-3. The computing device may open the third document version 312-3 of the document. The user may modify the document. After the user modifies the document, the user may save the changes as an updated version (e.g., a fourth document version 312-4 of the document). As discussed herein, the decision management system may automatically save the updated version as the fourth document version 312-4. When the fourth document version 312-4 is generated, the GUI 326 may generate a sixth selectable icon 330-6.

In accordance with at least one embodiment of the present disclosure, the user may link the fourth document version 312-4 to a business decision. For example, the user may generate a second business decision link 320-2 to a particular business decision. The GUI 326 may generate a fifth selectable icon 330-5. In this manner, the user may maintain the board 328 of the document up to date with the current version of the document and the business decision link to the associated business decision.

Figure 4:
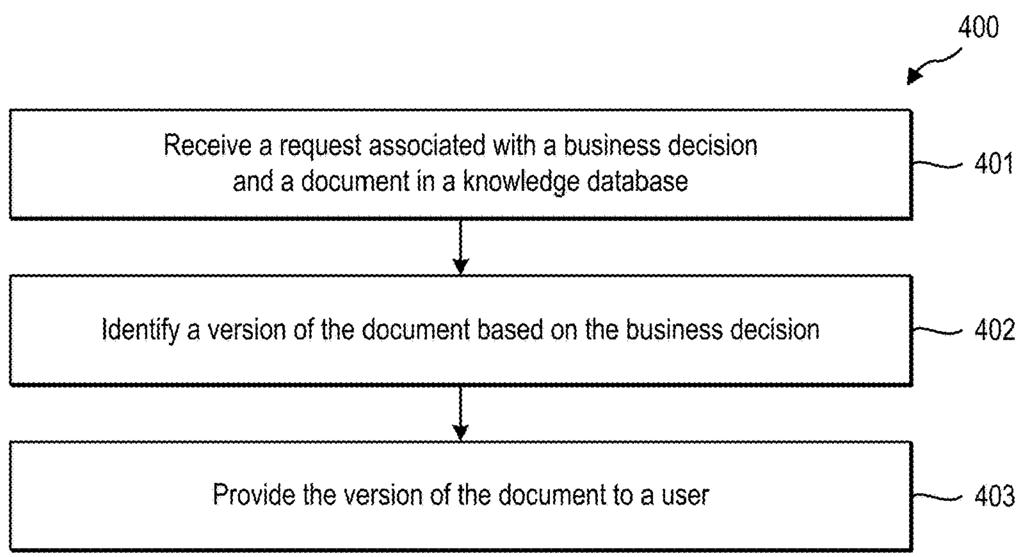
FIG. 4 is a flowchart of a method for maintaining document continuity, according to at least one embodiment of the present disclosure.
Figure 5:
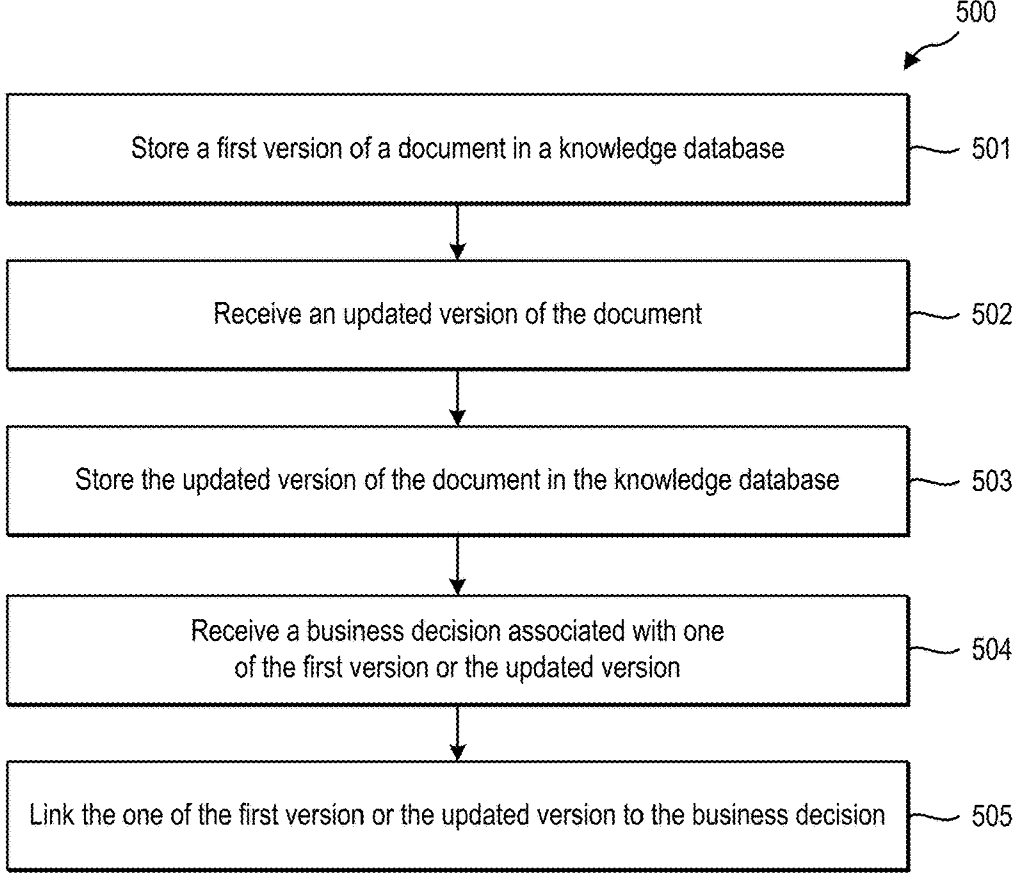
FIG. 5 is a flowchart of a method for maintaining document continuity, according to at least one embodiment of the present disclosure.
Figure 6:
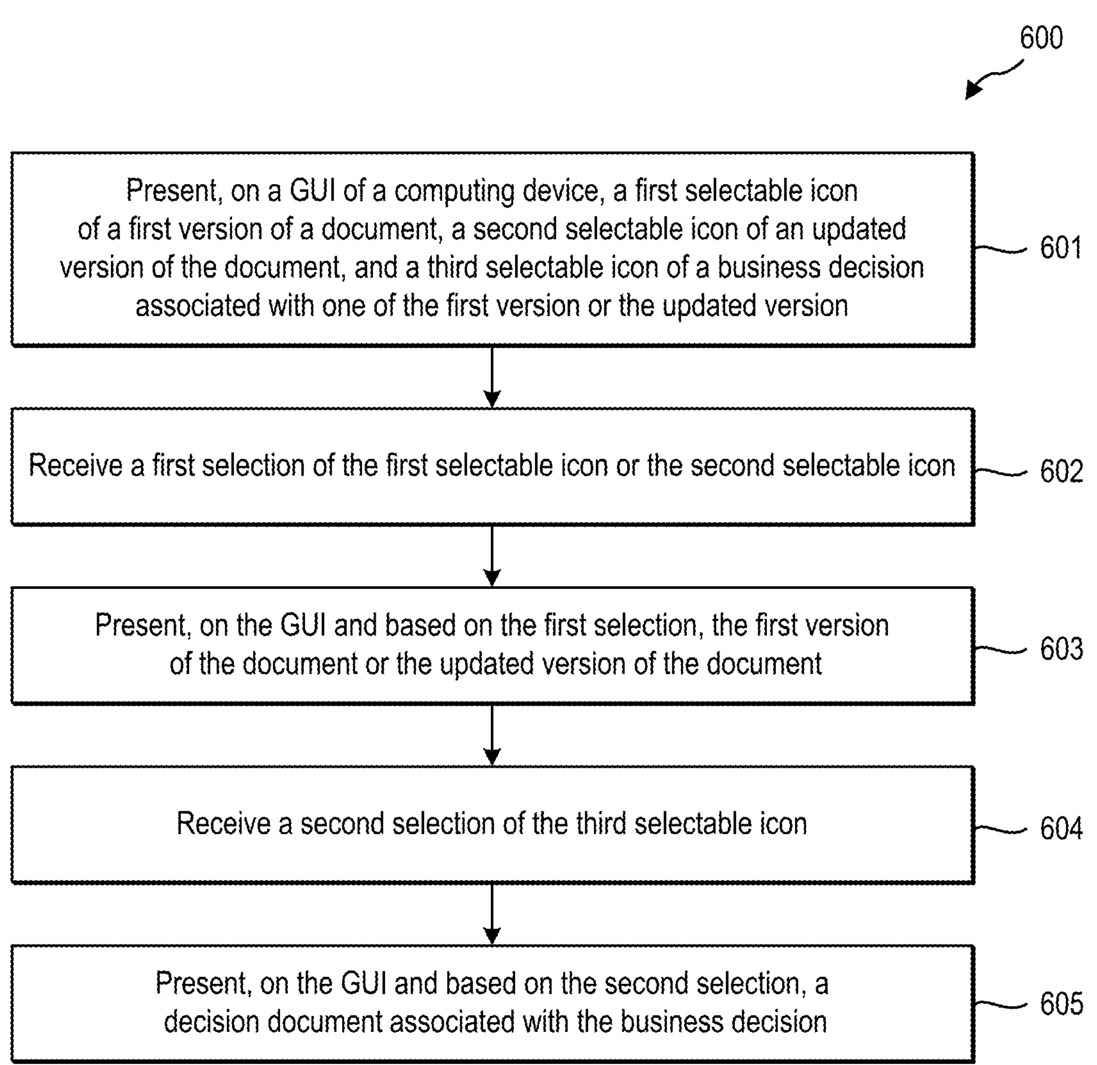
FIG. 6 is a flowchart of a method for maintaining document continuity, according to at least one embodiment of the present disclosure.

FIGS. 4-6, the corresponding text, and the examples provide a number of different methods, systems, devices, and computer-readable media of the decision management system. In addition to the foregoing, one or more embodiments can also be described in terms of flowcharts comprising acts for accomplishing a particular result, as shown in FIGS. 4-6. FIGS. 4-6 may be performed with more or fewer acts. Further, the acts may be performed in differing orders. Additionally, the acts described herein may be repeated or performed in parallel with one another or parallel with different instances of the same or similar acts.

As mentioned, FIG. 4 illustrates a flowchart of a series of acts or a method 400 for maintaining document continuity, according to at least one embodiment of the present disclosure. While FIG. 4 illustrates acts according to one embodiment, alternative embodiments may omit, add to, reorder, and/or modify any of the acts shown in FIG. 4. The acts of FIG. 4 can be performed as part of a method. Alternatively, a computer-readable medium can comprise instructions that, when executed by one or more processors, cause a computing device to perform the acts of FIG. 4. In some embodiments, a system can perform the acts of FIG. 4.

The decision management system may receive a request associated with a business decision and a document in a knowledge database at 401. The decision management system may identify a version of the document based on the business decision at 402. The decision management system may provide the version of the document to the user at 403.

In some embodiments, when the business decision is not linked to any version of the document, when the decision management system identifies the version of the document, the decision management system may identify a most recent version (e.g., an up-to-date version) of the document. In some embodiments, the business decision may include a business decision that has not been made. When the business decision has not been made, the decision management system may identify the most recent version of the document. In some embodiments, the decision management system may link the most recent version of the document to a business decision. In some embodiments, the document includes information used to make the business decision.

In some embodiments, the decision management system may modify the version of the document with additional information, generating an updated version. For example, the decision management system may modify the version of the document based on an input or request from a user. In some examples, the decision management system may automatically modify the version of the document when the earlier version is modified. The decision management system may store the updated version in the knowledge database. In some embodiments, the decision management system may link the business decision to the updated version.

As mentioned, FIG. 5 illustrates a flowchart of a series of acts or a method 500 for maintaining document continuity, according to at least one embodiment of the present disclosure. While FIG. 5 illustrates acts according to one embodiment, alternative embodiments may omit, add to, reorder, and/or modify any of the acts shown in FIG. 5. The acts of FIG. 5 can be performed as part of a method. Alternatively, a computer-readable medium can comprise instructions that, when executed by one or more processors, cause a computing device to perform the acts of FIG. 5. In some embodiments, a system can perform the acts of FIG. 5.

A decision management system may store a first version of a document in a knowledge database at 501. The decision management system may receive an updated version of the document at 502. The decision management system may store the updated version of the document in the knowledge database at 503. The decision management system may receive a business decision associated with one of the first version or the updated version at 504. The decision management system may link the one of the first version or the updated version to the business decision at 505.

In some embodiments, storing the updated version includes maintaining the first version of the document in the knowledge database. In some embodiments, linking the first version or the updated version to the business decision includes linking data within the first version or the updated version to the business decision. In some embodiments, linking the data includes linking the data to a portion of the business decision.

In some embodiments, the decision management system may retrieve, from the knowledge database, the updated version of the document. The decision management system may receive a second updated version of the document and store the second updated version of the document in the knowledge database. In some embodiments, storing the second updated version includes storing the second updated version without modifying the first version or the updated version of the document.

In some embodiments, the decision management system may display, on a display, the first version, the updated version, the business decision, and the link.

In some embodiments, storing the updated version includes automatically storing the updated version based on changes between the first version and the updated version. In some embodiments, storing the updated version includes automatically linking the business decision to the updated version after the business decision is completed or made.

In some embodiments, linking the one of the first version or the updated version to the business decision includes providing correspondence information for a responsible person associated with the business decision.

As mentioned, FIG. 6 illustrates a flowchart of a series of acts or a method 600 for maintaining document continuity, according to at least one embodiment of the present disclosure. While FIG. 6 illustrates acts according to one embodiment, alternative embodiments may omit, add to, reorder, and/or modify any of the acts shown in FIG. 6. The acts of FIG. 6 can be performed as part of a method. Alternatively, a computer-readable medium can comprise instructions that, when executed by one or more processors, cause a computing device to perform the acts of FIG. 6. In some embodiments, a system can perform the acts of FIG. 6.

A decision management system may present, on a GUI of a computing device, a first selectable icon of a first version of a document in a knowledge database, a second selectable icon of an updated version of the document in the knowledge database, and a third selectable icon of a business decision associated with one of the first version or the updated version at 601. The decision management system may receive a first selection of the first selectable icon or the second selectable icon at 602. The decision management system may present, on the GUI and based on the first selection, the first version of the document or the updated version of the document at 603. The decision management system may receive a second selection of the third selectable icon at 604. The decision management system may present, on the GUI and based on the second selection, supporting documentation associated with the business decision at 605.

Figure 7:
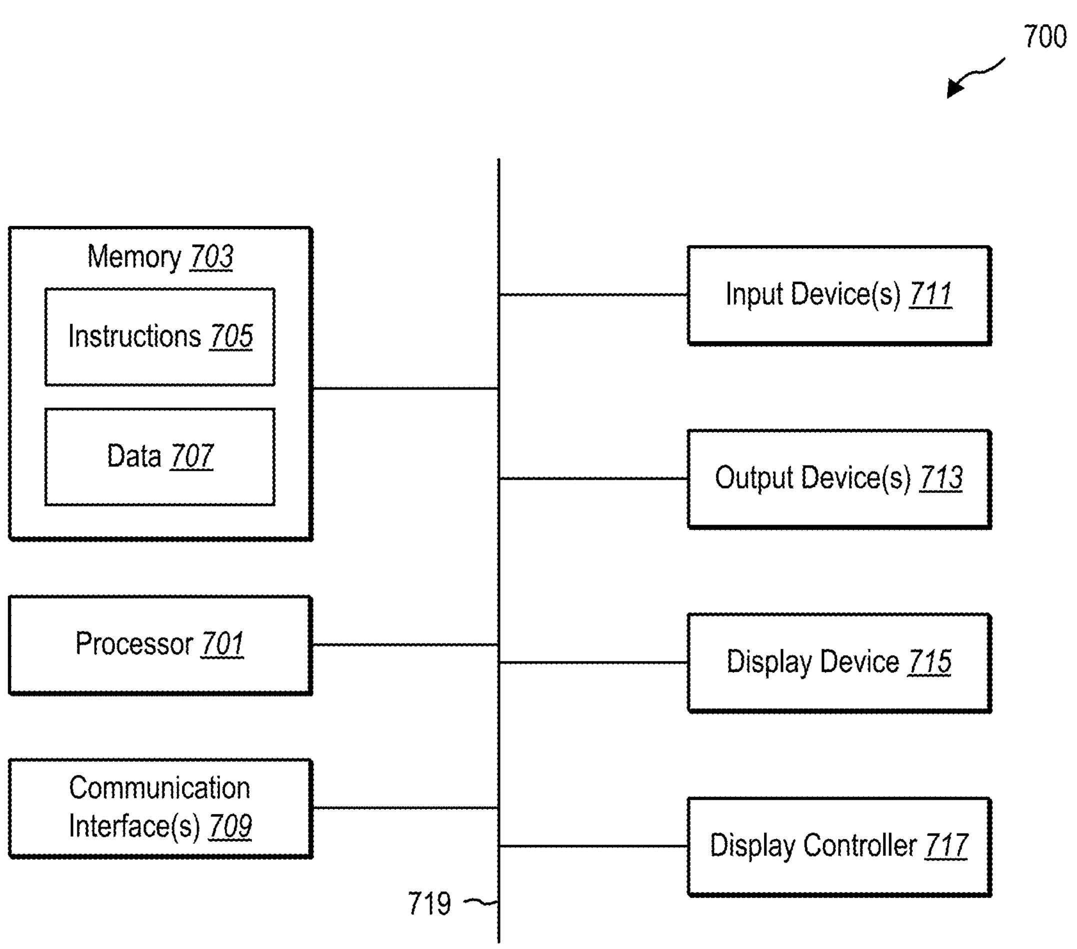
FIG. 7 is a representation of a computing system, according to at least one embodiment of the present disclosure.

FIG. 7 illustrates certain components that may be included within a computer system 700. One or more computer systems 700 may be used to implement the various devices, components, and systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method for maintaining document continuity, the method comprising:

storing a first version of a document in a knowledge database;

generating, for the first version of the document, a first selectable icon on a graphical user interface (GUI) of a computing device;

receiving a second version of the document;

storing the second version of the document in the knowledge database;

generating, for the second version of the document, a second selectable icon on the GUI;

receiving a first business decision associated with the second version;

linking the second version to the first business decision;

receiving a third version of the document;

generating, for the third version of the document, a third selectable icon on the GUI;

receiving a second business decision associated with the third version of the document;

identifying whether supporting documentation associated with the second business decision exists for the third version of the document;

responsive to the supporting documentation not existing, generating new supporting documentation for the third version of the document by identifying a user that has previously accessed the third version; and linking the new supporting documentation to the third version of the document.

2. The method of claim 1, wherein storing the second version of the document includes maintaining the first version of the document in the knowledge database.

3. The method of claim 1, wherein linking the second version to the first business decision includes linking data within the second version to the first business decision.

4. The method of claim 3, wherein linking the data includes linking the data to a portion of the first business decision.

5. The method of claim 1, wherein storing the third version includes storing the third version without modifying the first version or the second version of the document.

6. The method of claim 1, further comprising displaying, on the GUI, the first version, the second version, the third version, the first business decision, the second business decision, and the new supporting documentation.

7. The method of claim 1, wherein storing the second version includes automatically storing the second version based on changes between the first version and the second version.

8. The method of claim 1, wherein storing the second version includes automatically linking the first business decision to the second version after the first business decision is completed.

9. The method of claim 1, wherein linking the second version to the first business decision includes providing correspondence information for a responsible person associated with the first business decision.

10. A method for maintaining document continuity, the method comprising:

presenting, on a graphical user interface (GUI) of a computing device, a first selectable icon of a first version of a document in a knowledge database, a second selectable icon of a second version of the document in the knowledge database, a third selectable icon of a third version of the document in the knowledge database, and a fourth selectable icon of a first business decision made using the second version of the document;

receiving a first selection of the first selectable icon;

presenting, on the GUI and based on the first selection, the first version of the document, wherein the first version is only accessible via the first selection;

receiving a second selection of the third selectable icon;

responsive to the second selection, identifying whether supporting documentation associated with a second business decision exists for the third version of the document;

responsive to the supporting documentation not existing, generating new supporting documentation for the third version of the document by identifying a user that has previously accessed the third version;

linking the new supporting documentation to the third version of the document; and presenting, on the GUI, the new supporting documentation associated with the second business decision.

11. The method of claim 10, further comprising presenting, on the GUI, quality assurance information.

12. The method of claim 10, wherein generating the new supporting documentation includes querying the user for information for the supporting documentation.

13. The method of claim 10, wherein generating the new supporting documentation includes identifying previous business decisions and generating the new supporting documentation based on the previous business decisions.

14. The method of claim 10, wherein the second business decision includes a plurality of second business decisions and the new supporting documentation includes a plurality of new supporting documentations, and wherein linking the new supporting documentation to the third version includes linking the plurality of new supporting documentations to the third version of the document.

15. A non-transitory computer-readable medium storing instructions that, when executed by one or more processors of a computing system, cause the computing system to perform operations, the operations comprising:

presenting, on a graphical user interface (GUI) of a display, a first selectable icon of a first version of a document in a knowledge database, a second selectable icon of a second version of the document in the knowledge database, a third selectable icon of a third version of the document in the knowledge database, and a fourth selectable icon of a first business decision made using the second version of the document;

receiving a first selection of the first selectable icon;

presenting, on the GUI and based on the first selection, the first version of the document, wherein the first version is only accessible via the first selection;

receiving a second selection of the third selectable icon;

responsive to the second selection, identifying whether supporting documentation associated with a second business decision exists for the third version of the document;

responsive to the supporting documentation not existing, generating new supporting documentation for the third version of the document by identifying a user that has previously accessed the third version and using previous business decisions;

linking the new supporting documentation to the third version of the document; and presenting, on the GUI, the new supporting documentation associated with the second business decision.

* * * * *